D. E. WASHINGTON.
TRANSMISSION GEARING.
APPLICATION FILED MAR. 26, 1908.
918,936.
Patented Apr. 20, 1909.
4 SHEETS—SHEET 1.
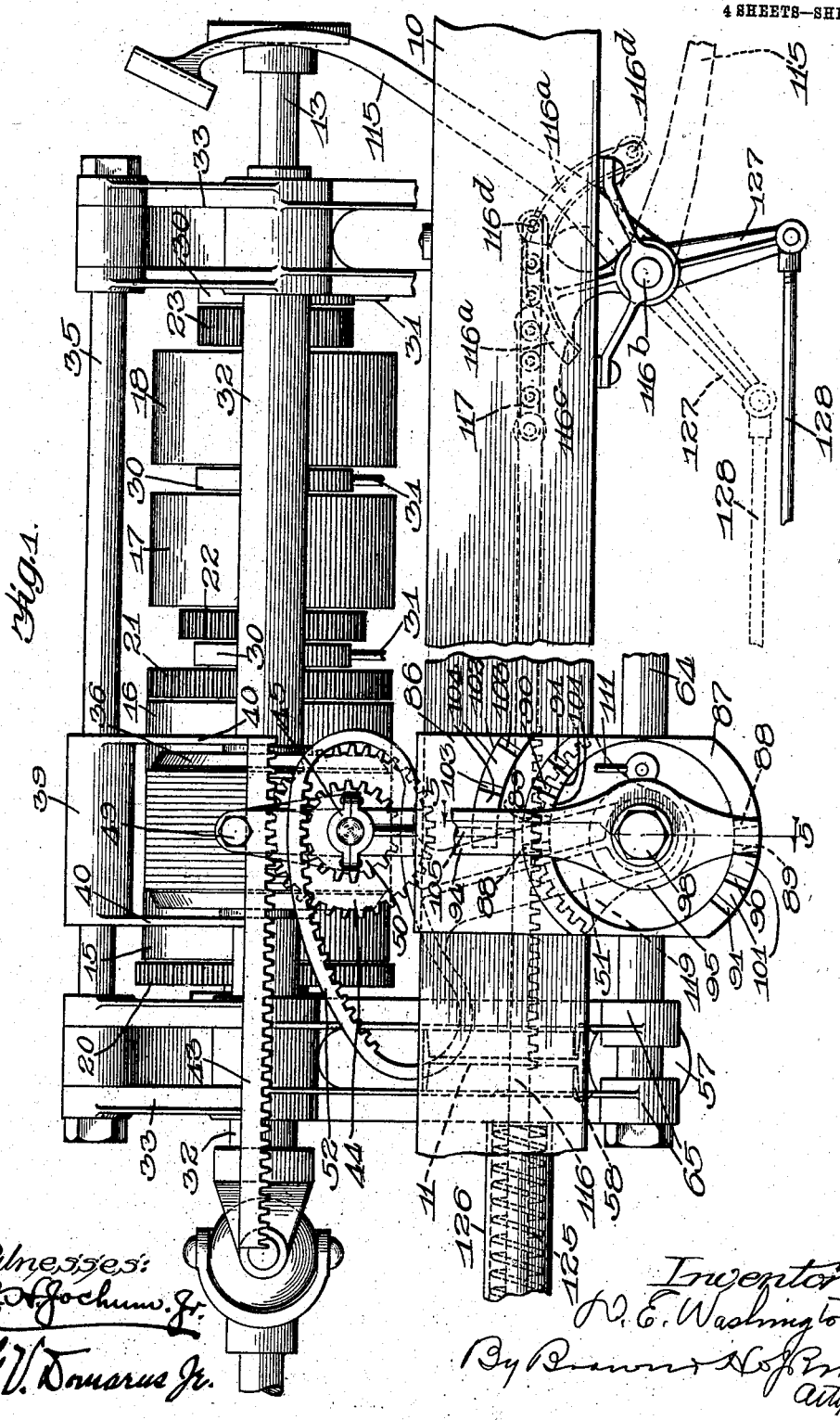

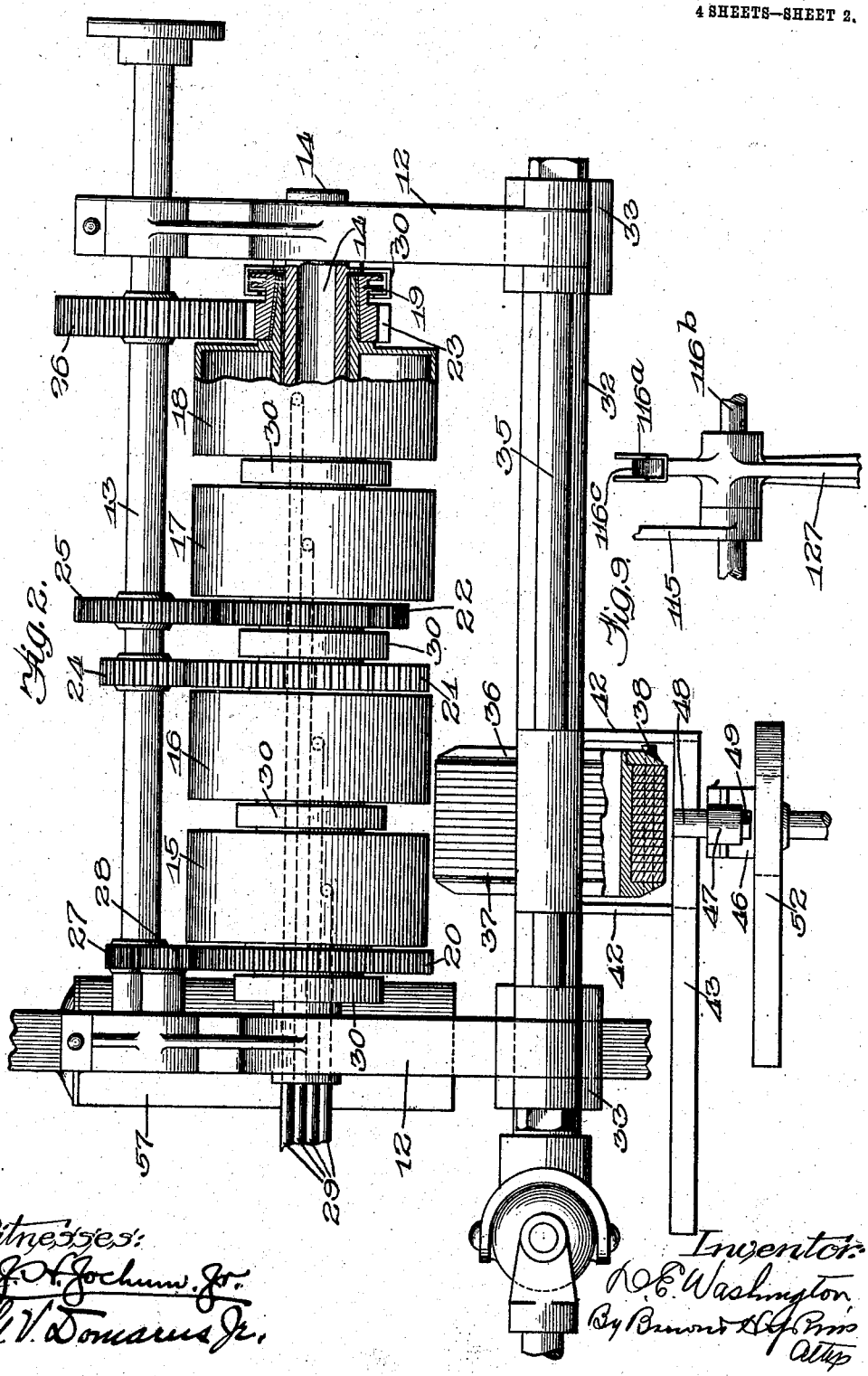

D. E. WASHINGTON.
TRANSMISSION GEARING.
APPLICATION FILED MAR. 26, 1908.
918,936.
Patented Apr. 20, 1909.
4 SHEETS—SHEET 3.
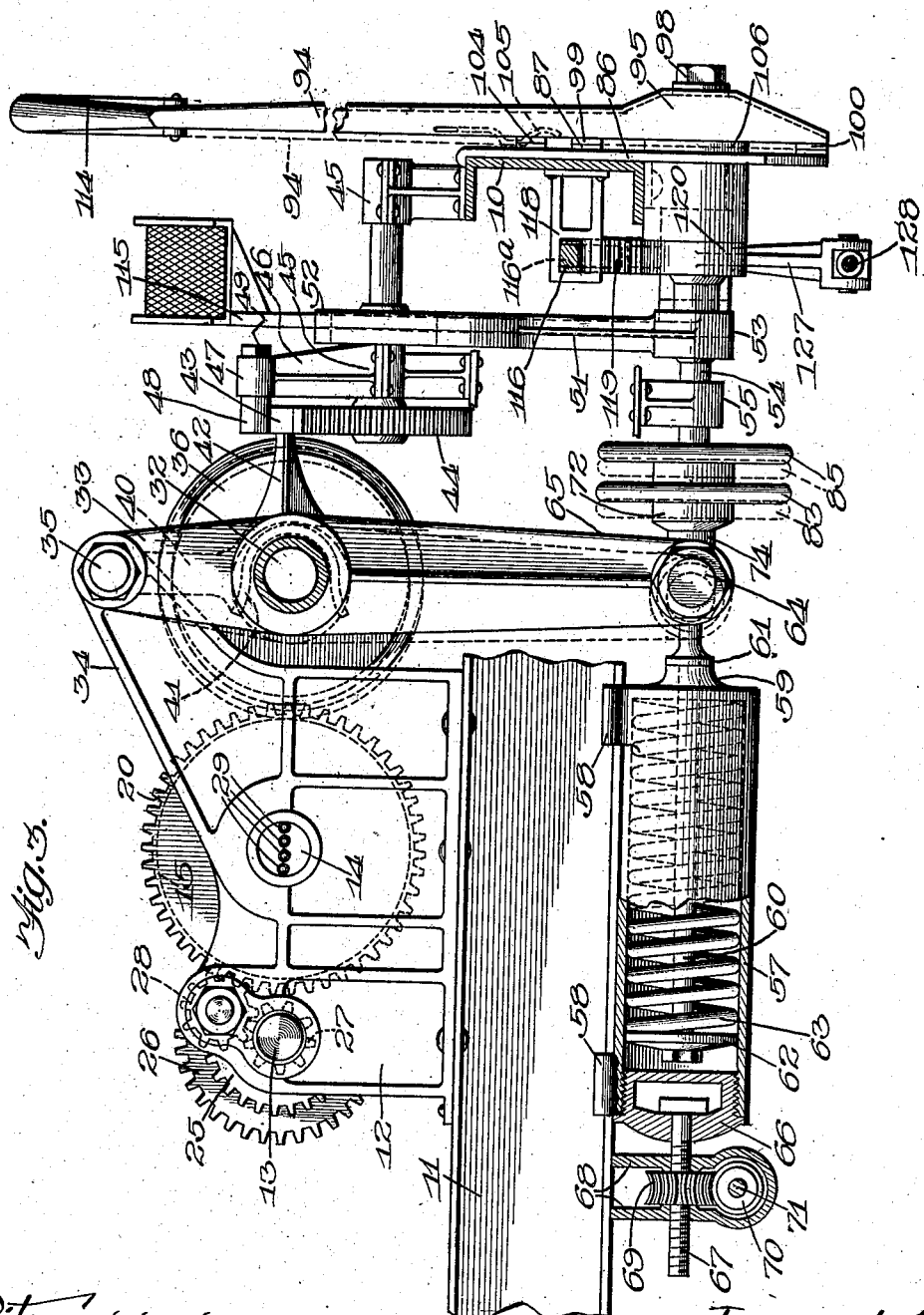

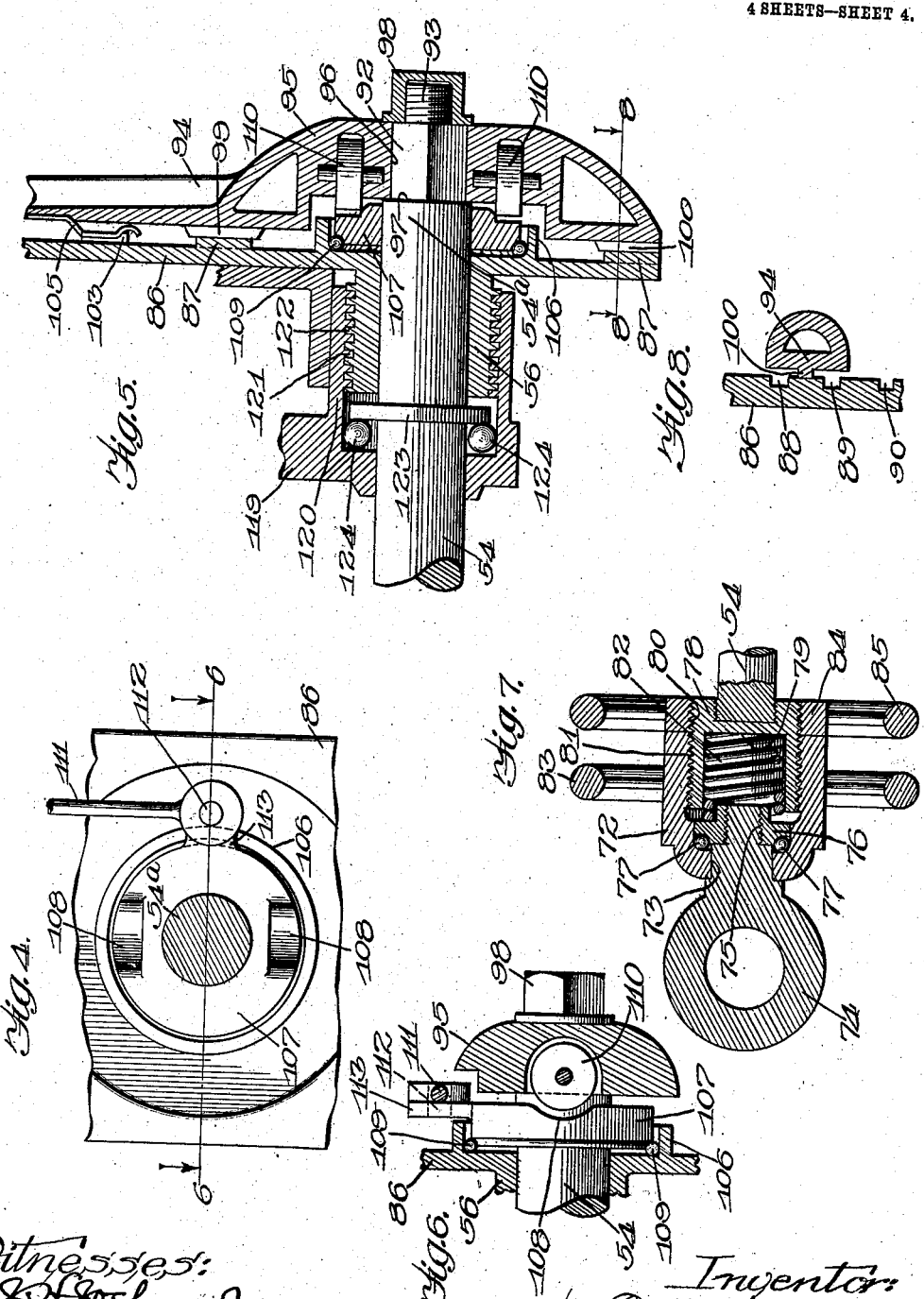

UNITED STATES PATENT OFFICE.

DIXON E. WASHINGTON, OF CHICAGO, ILLINOIS, ASSIGNOR OF ONE-FOURTEENTH TO JOHN F. TIPPETT, ONE-FOURTEENTH TO GEORGE C. VOLTZ, ONE-FOURTEENTH TO A. E. BOTTOFF, ONE-FOURTEENTH TO MICHAEL CONWAY, ONE-FOURTEENTH TO HARRY HUNT, ONE-FOURTEENTH TO C. W. PATTON, ONE TWENTY-EIGHTH TO P. D. FINLAYSON, AND ONE THIRTY-FIFTH TO ROY C. HARWOOD, ALL OF CHICAGO, ILLINOIS.

TRANSMISSION-GEARING.

No. 918,936.      Specification of Letters Patent.      Patented April 20, 1909.

Application filed March 26, 1908. Serial No. 423,307.

*To all whom it may concern:*

Be it known that I, DIXON E. WASHINGTON, a citizen of the United States, residing at Chicago, in the county of Cook and State of Illinois, have invented certain new and useful Improvements in Transmission-Gearing, of which the following is a specification.

This invention relates to improvements in transmission gearing and the primary object of the same is to provide an improved form of friction gearing including a driving and a driven shaft, and improved means for varying the speed of one of the shafts with respect to the other shaft.

A further object is to provide an improved friction gearing including a plurality of rotatable variable speed driving elements, and a rotatable driven element adapted to separately engage the driving elements, and improved means for adjusting the driven element longitudinally with respect to the driving elements.

A further object is to provide improved means for preventing the engagement of the driven element with the driving element until the entire surface of one of the elements is properly positioned with respect to the other element.

A further object is to provide improved means for shifting the driven element into and out of engagement with the driving element and improved means for preventing engagement of the elements when the adjustable element is being shifted.

A further object is to provide an improved safety attachment whereby the attention of the operator will be directed to the position of the driven element with respect to the driving elements when starting and for throwing the operating lever into an inoperative position to prevent the mechanism from being suddenly started at a high rate of speed.

A further object is to provide an improved device of this character which will be simple and durable in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an embodiment of the invention, and in which—

Figure 1 is a side elevation, partly broken away, of an improved gearing constructed in accordance with the principles of this invention. Fig. 2 is a detail top plan view. Fig. 3 is an end elevation partly in section and partly broken away, showing the parts in full lines in an inoperative position and in dotted lines in an operative position. Fig. 4 is a detail elevation of the ring or member for moving the driven element out of engagement with the driving elements. Fig. 5 is an enlarged detail sectional view on line 5—5 of Fig. 1. Fig. 6 is a sectional view on line 6—6 of Fig. 4. Fig. 7 is an enlarged detail sectional view showing the manner of connecting the two elements of the sectional lever shaft and for adjusting the length of said shaft. Fig. 8 is a detail sectional view on line 8—8 of Fig. 5. Fig. 9 is a detail elevation showing the foot lever and rock shaft operated thereby and also the operating segment connected to said shaft.

The present exemplification of the invention shows this improved gearing as constructed and arranged for use with motor vehicles and in the drawings the numeral 10 designates one of the longitudinal beams of the supporting frame work and 11 designates a transverse beam, any number of which may be employed to connect the side beams 10 to form the supporting frame work of the vehicle, and supported by this frame work are spaced brackets 12, provided with suitable bearings in which is journaled the shaft 13. The brackets or supports 12 are preferably arranged in such a position that the shaft 13 will extend longitudinally of the vehicle and an axle 14 is supported by suitable bearings in the brackets 12 adjacent to and parallel with the shaft 13. Journaled upon the axle 14 is a series of rotatable friction gear elements 15, 16, 17 and 18, which may be spaced from each other in any desired or suitable manner, preferably by means of spacing collars 19, and secured to each of the friction elements are respectively gears 20, 21, 22, 23, which gears are of varying sizes and the gears 21, 22, 23 are adapted to mesh respectively with gears 24, 25 and 26 secured to and for rotation with the shaft 13 and these latter gears are of varying sizes whereby a variable speed will be imparted to the shaft 13 by the friction gear elements. A similar gear 27 is secured to and for rotation with the shaft 13 and an idle gear 28 is supported by a suitable bracket, preferably the bracket 12, and meshes with the gear 27 and the gear 20 by means of which the shaft 13 may be rotated in an opposite direction when motion is imparted thereto through the medium of the friction gear element 15. The axle 14 is preferably hollow, as shown more clearly in Fig. 2 of the drawings and arranged within the axle is a plurality of lubrication tubes 29 which lead from any suitable source of supply and these tubes are adapted to discharge through a suitable aperture in the axle adjacent the hub of the respective gear element to lubricate said element, and a suitable cap 30 may be provided for covering the collars 19 to confine and prevent the lubricant from escaping, and as the lubricant accumulates in the caps 30, it may be conducted to a suitable point of discharge from said caps by means of suitable discharge pipes or tubes 31.

In the present exemplification of the invention the numeral 13 designates the engine or driving shaft and 32 designates the propeller shaft which is driven from the engine shaft but it is to be understood that these shafts may be reversed and the shaft 32 may receive its motion from the engine while the shaft 13 may be driven from the shaft 32.

The shaft 32 is journaled in suitable bearings in spaced arms 33 at points intermediate their ends. One end of each of the arms 33 is pivotally supported by means of an arm or extension 34 of the bracket 12 and a tie-rod or bolt 35 may be provided for connecting the arms and for forming the pivot bearing. The shaft 32 is journaled in close proximity to and is parallel with the axle 14 which supports the friction gear elements 15, 16, 17 and 18, and mounted upon the shaft 32 for sliding movement longitudinally thereof is a friction gear element 36 which may be secured for rotation with the shaft in any desired or suitable manner, preferably by means of the ordinary key and groove construction (not shown). The friction gear element 36 may be of any desired construction but preferably comprises a laminated structure having fiber members 36 clamped between the end plates by means of suitable bolts or fastening means 38 shown more clearly in Fig. 2 of the drawings.

A yoke 39 is pivotally supported for sliding movement upon the tie-rod or bolt 35 and comprises spaced arms 40 adapted to stand on each side of the friction gear element 36 and these arms are provided with cut away or recessed portions 41 adapted to stand astride of the shaft 32 so that the yoke may be moved about its point of pivotal support to disengage the shaft 32 and to permit the friction gear element 36 to be readily removed from the shaft 32.

The arms 40 of the yoke 39 are preferably provided with laterally projecting portions 42, which are of a length to extend beyond the periphery of the friction gear element 36 and are connected by means of a rack bar 43 which may be of any desired length and extends longitudinally with respect to the shaft 32 to permit the yoke and friction gear element 36 to be shifted longitudinally on the shaft 32 by means of a gear 44, the axle of which is journaled in suitable bearings 45 supported by the frame work of the machine and which gear meshes with the teeth of the rack 42 so that when the gear 44 is rotated in a manner to be set forth, the yoke 39 will be shifted in either direction according to the direction of rotation of the gear 44. One of the bearings 45 is preferably provided with an upwardly projecting portion 46 having a bearing 47 at the free end thereof, and journaled in said bearing is an anti-friction roller 48, which is adapted to engage and rest upon the top of the rack 43 to hold the latter in engagement with the gear 44, and the anti-friction roller 48 is held against accidental displacement by means of a suitable fastening bolt 49 located on the outside of the bearing 47 so that when it is desired to swing the yoke 39 about its pivot to permit the removal of the friction gear element 36 the bolt 49 and anti-friction roller 48 may be removed when the yoke is to one side of the bracket 46, after which the yoke may be adjusted about its pivot, causing the arms 40 to disengage the shaft 32.

Any suitable means may be provided for rotating the gear 44. A suitable and efficient means for accomplishing this purpose comprises a gear 50 (shown more clearly in Fig. 1) which is secured to the axle of the gear 44 and a pivoted arm or lever 51 which is provided with an enlarged segmental extremity 52 meshing with the gear 50. The free end 53 of the arm or lever 51 is secured to a shaft 54 which latter is journaled in suitable bearings 55, 56, so that when the shaft 54 is rotated or oscillated in its bearing the lever 51 will be oscillated in one direction according to the direction of rotation of the shaft 54. The segmental end 52 of the lever 51 and the gear 50 with which the segment meshes are of such a width as to permit the shaft 54 to move longitudinally without causing the segment to disengage the gear 50.

Any suitable means may be provided for holding the friction gear element 36 in engagement with one of the gear elements 15, 16, 17 and 18 according to the position of the gear element 36 with respect thereto. A suitable and efficient means for accomplishing this purpose comprises a tension device, the casing 57 of which is slidingly mounted by means of brackets 58 upon a suitable portion of the frame work of the vehicle. One end of the casing is preferably closed as at 59 and one extremity of a bar or rod 60 projects through the end 59 and is provided with a collar or shoulder 61 adapted to rest against said end. Secured to the other end of the bar or rod 60 is a piston head 62 and disposed between the piston head 62 and the closed end 59 and surrounding the bar or rod 60 is a suitable expansion member 63 preferably in the form of a coil spring, the normal tendency of which is to cause the shoulder or collar 61 to be seated against the end 59 of the casing 57. The free end of the bar or rod 60 which is located beyond the end 59 of the casing is preferably provided with an eye adapted to surround a bar or rod 64 which connects the free extremities 65 of the arms or levers 33 which latter are located adjacent the casing 57. It is to be understood that although only one of these tension members is illustrated, there is provided one on each side of the vehicle and adjacent each of the arms or levers 33. The casing 57 is provided with a closure 66 for the open end thereof and swiveled to said closure is a bolt 67 which extends beyond the casing and passes through the walls 68 of a housing in which is located a worm gear 69 which surrounds the bolt 67 so that when the worm gear is rotated the bolt will be adjusted longitudinally with respect to the worm gear to cause the casing 57 to slide on the supporting portion of the frame work, thereby varying the tension of the expansion member 63.
Any suitable means may be provided for rotating the worm 69 such as a worm gear 70 meshing therewith and which latter is secured for rotation upon a suitable crank shaft 71. The free extremity 65 of the arms or levers 33 are also connected to the shaft 54 so that when the shaft 54 is moved longitudinally, in a manner to be set forth, the extremities 65 of the arms 33 will be moved with the shaft to rock the arms 33 about their points of pivotal support 35 to move the friction gear element 36 into and out of engagement with the respective coöperating friction gear elements 15, 16, 17, 18. Any suitable means may be provided for so connecting the extremities 65 of the arms 33 to the shaft which will at the same time permit the shaft 54 to be axially rotated. A suitable and efficient means for accomplishing this result will now be described, particular reference being had to Fig. 7 of the drawings. A cup-shaped member 72 is provided with an aperture 73 in the closed end thereof, through which a portion of an eye-bolt 74 projects. The extremity of the eye-bolt which extends into the member 72 is preferably reduced and screw threaded as at 75 and a collar 76 is screwed onto said extremity within the member and coöperates with the closed end of the member to form bearings for the anti-friction balls or rollers 77. Secured to the free end of the shaft 54 is a member 78 which is provided with a recessed portion 79 in the free end thereof and the member 78 is provided with peripheral screw threads 80 adapted to engage similar screw threads 81 within the member 72, by means of which one of the members 72, 78, may be adjusted longitudinally with respect to each other, and seated within the recessed portion 79 is an elastic member 82, such as a coil spring or the like, one end of which rests against the seat of the recessed portion 79 and the other end has engagement with the collar 76, whereby the collar will be forced toward the closed end of the member 72. The member 72 may be provided with an adjustable handle, such as a wheel 83, secured to the periphery thereof, by means of which it may be adjusted, and a jam-nut or collar 84 may be screwed to the periphery of the member 78 so as to engage the end of the member 72 to lock the members 78, 72 in their adjusted position with respect to each other and this jam-nut or collar 84 may be provided with an adjusting handle 85 preferably in the form of a hand wheel, as shown. The member 72 is located adjacent the bar or rod 64 which connects the extremities 65 of the arms or levers 63 and at a point intermediate said arms, so that the bar or rod 64 will pass through the eye of the bolt 74. With this construction it will be apparent that the joint formed by the member 72, collar 76 and eye-bolt 74 will permit the shaft 54 to be axially rotated and at the same time will not interfere with the action of the tension device, which latter causes the friction gear element 36 to be moved against the coöperating gear element.

Supported by the frame work 10 of the vehicle and adjacent the bearing 56 is a plate 86, shown more clearly in Fig. 1 of the drawings and this plate is preferably provided with a raised circumferential portion 87 which surrounds the bearing 56. This portion 87 is provided with a series of spaced grooves or slots 88, 89, 90, 91, on the upper portion thereof and a series of corresponding and diametrically opposite grooves or slots 88, 89, 90 and 91 located in the lower portion of the raised portion 87. The forward end 54ª of the shaft 54 projects through the plate 86 and terminates in an angular portion 92 which is preferably provided with a reduced threaded extremity 93 (see Fig. 5). An operating lever 94 is provided with an enlarged portion 95 having an angular aperture 96 through which the angular portion 92 of the shaft 54 projects and this lever is secured against longitudinal displacement with relation to the shaft 54 by means of a shoulder 97 formed by the angular portion 92 and against which the one face of the portion 95 of the lever rests, and a cap nut engaging the threaded extremity 93 which engages and rests against the outer face of the portion 95 of the lever. The lever is provided with laterally projecting lugs 99, 100, which extend from the face of the lever adjacent the plate 86 and one of these lugs or projections is adapted to stand within and travel in a plane adjacent the respective portions of the raised portion 87 which are provided with a series of grooves or notches, 88—91, and the lugs are arranged diametrically opposite to each other so that when the lever is rocked to cause one of the lugs to enter one of the grooves or slots, the opposite lug will also enter the diametrically opposite groove or slot in the portion 87. These grooves or slots are spaced from each other to form an extended flat surface 101 therebetween, and adjacent which the lugs 99, 100 are adapted to stand when the parts assume a certain position, as will be described. The plate 86 is also provided with a raised portion 102 located in proximity to the raised portion 87 preferably adjacent the top thereof and spaced therefrom. This portion 102 is also provided with a series of spaced slots or grooves 103 which form bearing faces 104 therebetween and these slots 103 are located to stand in line with the flat bearing faces 101 on the adjacent portion of the raised portion 87 while the bearing faces 104 stand in line with the grooves 89, 90 and 91 in the portion 87. Secured to the rear face of the lever 94 is a yielding member 105 in the form of a spring which is adapted to enter the respective groove or slot 103 when the lever is in a position to cause the spring to stand opposite the slot, and to engage and rest upon the bearing face 104 when in proximity thereto.

Surrounding the extremity 54ª of the shaft 54 is a flange or collar 106 and supported by the extremity 54ª of the shaft and located within the space formed by the flange or collar 106 is a ring or member 107 which latter is mounted for independent movement upon the extremity of the shaft and is provided with recessed portions 108 in the face thereof adjacent the lever, and disposed between said ring or member and the face of the plate 86 within the flange 106 are anti-friction rollers 109. Journaled in the portion 95 of the lever 94 are rollers 110 which project beyond the face of said portion and are adapted to be seated in the grooves or recesses 108 in the ring or member 107 when the ring or member is in a proper position to permit the rollers to enter the grooves or recesses. When the rollers 110 are seated within these grooves or recesses 108, the tension of the spring 63 of the tension device will rock the arms or levers 33 about the points of pivotal support to cause the friction gear element 36 to contact with one of the friction gear elements 15, 16, 17, 18, but when the grooves or recesses 108 of the member 107 and the rollers 110 are displaced with respect to each other, the shaft 54 will be moved longitudinally against the tension of the spring 63 to cause the friction gear element 36 to move out of engagement with the coöperating friction gear element. These parts may be displaced with relation to each other in any suitable manner, preferably by rotating the member 107 about the axle 54. This may be accomplished by means of a bar or rod 111, which is pivotally connected by one extremity as at 112 to a suitable ear or projection 113 on the member 107 which extends beyond the flange 106. The free extremity of the bar or rod 111 may be connected in the usual manner to a rocker arm 114 located adjacent the handle of the lever 94 so that when the handle of the lever is gripped by the operator the rocker arm 114 will also be gripped and by moving the latter about its point of pivotal support, the bar or rod 111 will be moved longitudinally and the member 107 will be rotated. When this member 107 is rotated it will be seen that as the grooves or recesses 108 are moved away from the rollers 110, the flat face of the member 107 will engage the rollers and tend to force the same together with the lever 94 outwardly, which will move the shaft 54 longitudinally against the tension of the tension device and will be held in this position until the rocker arm 114 is released and when released the ordinary spring (not shown) will return the arm 114 to its normal position and cause the member 107 to assume a position that the grooves or recesses 108 will be adjacent the rollers 110. As the shaft 54 is thus longitudinally adjusted and the lever moved away from the plate 86, the lugs or projections 99, 100, will be moved out of the grooves or slots 88—91, to permit the lever to be freely rocked to axially rotate the shaft 54 and during this axial rotation of the shaft, the friction gear element 36 will be shifted longitudinally on the shaft 32 until it has assumed a position adjacent a predetermined one of the coöperating gear elements 15, 16, 17, 18, through the medium of the arm or lever 51, gear 50, gear 44, rack 43 and yoke 39, and when in this position the rock arm 114 may be released to permit the member 107 to assume a proper position with respect to the rollers 110 to permit the latter to enter the grooves or recesses 108. When the parts are in this position the tension members 63 will draw the friction gear element 36 into engagement with the respective coöperating gear elements 15, 16, 17 or 18. The grooves or slots 88, 89, 90 and 91 are so located that the shaft 54 will be held against its longitudinal return adjustment until the entire bearing surface of the friction gear element 36 stands in the plane between the edges of the bearing surface of the coöperating gear elements 15, 16, 17, 18, and with this construction it will be apparent that although the member 107 is allowed to assume its normal position or a position to permit the grooves or recesses 108 to stand adjacent the rollers 110 it will be impossible for the friction gear element 36 to contact with its coöperating gear element until the gear element 36 is properly positioned with respect thereto, thereby obviating all danger of the bearing surface of the friction gear element 36 overlapping or contacting with the bearing surfaces of two of the coöperating gear elements 15, 16, 17, or 18. The grooves or slots 103 and bearing faces 104 on the plate 86 are so located with respect to the grooves 88—91 and the bearing surfaces 101 that when the lugs 99, 100 rest in their respective grooves or slots, the spring 105 will engage and rest upon one of the bearing faces 104 and when the lugs 99, 100 are adjacent the bearing faces 101, the spring 105 will enter one of the grooves or slots 103 to hold or lock the lever against further accidental adjustment. With this construction it will also be apparent that it is impossible to cause the friction gear element 36 to move into engagement with any one of the coöperating gear elements until the former is properly adjusted and it also necessitates the moving of the friction gear element 36 entirely out of engagement with the coöperating gear elements before the former can be adjusted from one of the coöperating elements to the other.

In order to call the attention of the operator to the position of the controlling lever 94 which also indicates the position of the friction gear element 36 and to prevent the sudden starting of the gearing at a high rate of speed, any suitable form of a safety device or attachment may be provided. A simple and efficient device for this purpose will now be described. A foot lever 115 is supported in a convenient position for the operator and in such a position that it will be necessary for him to move the latter when desiring to start the gearing, and is connected to a rock shaft 116$^b$. A rack bar 116 is connected to a segment 116$^a$ which latter is also connected to the rock shaft 116$^b$, by means of a flexible member 117 such as a chain or the like, and this rack bar is adapted to move through suitable guides 118 supported by the frame, (see Fig. 3). The segment 116$^a$ is provided with a grooved face 116$^c$ into which the flexible member 117 is adapted to be seated when the segment is rocked. The flexible member 117 is preferably secured to the segment 116$^a$ by means of a pin or fastening device 116$^d$ at the forward end thereof. The segment 116$^a$ being separate from the foot lever 115 permits the position of the lever and the segment to be varied with respect to each other.

A segment 119 is provided with a hub 120 which surrounds the axle 54 and this hub also surrounds the bearing 56 and is provided with internal threads 121 adapted to engage similar threads 122 on the periphery of the bearing 56 so that when the segment 119 is oscillated it will be moved toward or away from the plate 86 according to the direction of oscillation thereof. The shaft 54 is preferably provided with a collar 123 between which and the end of the hub 120 are located suitable anti-friction rollers 124. The segment 119 also serves to move the shaft 54 longitudinally against the tension of the member 63 and as the segment is oscillated the threads 121, 122 will serve to cause this longitudinal adjustment when the foot lever 115 is depressed. A suitable tension member 125 may be provided for causing the foot lever and segment 119 to return to their normal position and if desired, a suitable housing 126 may be provided for inclosing the member 125.

The foot segment 116$^a$ may be provided with a depending arm 127 to which one extremity of the ordinary brake rod may be connected. The brake is normally held applied by means of the tension member 125 which also holds the foot lever 115 in the position shown in full lines in Fig. 1 and when the lever is depressed to the position shown in dotted lines in Fig. 1, the segment 116$^a$ will be rocked to cause the brake rod 128 to be adjusted to release the brake.

The controlling lever 94 may be shifted to position the friction gear element 36 independently of the attachment, the purpose of the attachment, as before stated, being to call the attention of the operator to the position of the friction gear element, which will cause him to adjust the friction gear element 36 into a position to engage the low speed coöperating element which, in the present exemplification of the invention, is the element 16. Should the controlling lever 94 be adjusted to such a position as to cause the friction gear element 36 to stand adjacent one of the high speed coöperating elements 17 or 18 when he leaves the machine, the foot lever 115 will assume the position shown in full lines in Fig. 1. On returning to the machine to start the same the first operation would be to depress the foot lever 115 to move the same out of the way of the operator. Just as soon as this foot lever 115 is depressed, the segment 119 will be fed on the bearing 56 in a direction away from the collar 123 to permit the spring 125 to longitudinally shift the shaft 54 to move the friction gear element 36 into engagement with one of the coöperating friction gear elements, if the lever 94 is properly positioned that the lugs or projections 99, 100 are in alinement with one set of the grooves 103. This longitudinal movement of the shaft will adjust the controlling lever 94 to the position shown in Fig. 6, that is, so that the rollers 110 will be moved out of the grooves or recesses 108 and if the lever is left in any position except the upright position shown in Fig. 1 of the drawings, such longitudinal movement of the shaft by the foot lever 115 will move the lugs or projections 99, 100, out of the grooves or notches in which they were seated and the lever will fall by gravity until the spring 105 enters one of the grooves or slots 103 on the member 102, and when the spring enters one of the slots the further forward movement of the lever will be arrested and will hold the lever in such a position that the lugs or projections 99, 100, will rest upon the bearing faces 101 between the grooves or slots. The operator may then grasp the lever 94 and move the same to shift the gear element 36 to the desired position. It is to be understood that the spring 105 is of sufficient tension to permit the same to be readily unseated when the lever is moved by the operator and at the same time will arrest the movement of the lever under the influence of gravity.

In the present exemplification of the invention the shaft 32 is illustrated as the propeller-shaft but it is to be understood that this shaft may be used as the engine shaft and the shaft 13 as the propeller shaft, which may be accomplished by shifting the gearing from which the friction gear elements 15, 16, 17 and 18 are operated, in the ordinary and well known manner. It is to be also understood that the face of the segment 119 or the rack 116 or both may be of sufficient width to permit the longitudinal adjustment of the shaft 54 without causing said members to disengage.

In order that the invention might be fully understood, the details of the foregoing embodiment thereof have been thus specifically described but

What I claim as new is—

1. The combination of a driving and a driven shaft, a plurality of variable speed friction gear elements operatively connected to one of said shafts, a coöperating friction gear element mounted upon the other shaft for rotation therewith, means for shifting the last said gear element longitudinally on its shaft with respect to the coöperating gear elements to position the same with respect to a predetermined one of the last said elements, and means tending normally to cause said gear elements to be brought into engagement.

2. The combination of a driving and a driven shaft, a plurality of variable speed friction gear elements operatively connected to one of said shafts, a coöperating friction gear element mounted upon the other shaft for rotation therewith, means for shifting the last said gear element longitudinally on its shaft with respect to the coöperating gear elements to position the same with respect to a predetermined one of the last said elements, means tending normally to cause said gear elements to be brought into engagement, and means coöperating with a portion of said shifting means for preventing the gear elements from engaging until the entire bearing face of the adjustable element is positioned in a plane between the edges of the bearing surface of the coöperating gear element.

3. The combination of a driving and a driven shaft, a plurality of variable speed friction gear elements operatively connected to one of said shafts, a coöperating friction gear element mounted for rotation with the other shaft, means for shifting the last said element longitudinally of the first said gear elements to position the same with respect to a predetermined one of said elements, means coöperating with a portion of the said shifting means for preventing the engagement of the gear elements while the shiftable one of the friction elements is being adjusted, and means tending normally to cause the friction elements to be brought into engagement when the last said element is properly positioned.

4. The combination of a driving and a driven shaft, a plurality of variable speed friction gear elements operatively connected to one of said shafts, a coöperating friction gear element mounted for rotation with the other shaft, means for shifting the last said element longitudinally of the first said gear elements to position the same with respect to a predetermined one of said elements, means coöperating with a portion of the said shifting means for preventing the engagement of the gear elements while the shiftable one of the friction elements is being adjusted, and elastic means for causing the friction elements to be brought into engagement when the last said element is properly positioned.

5. The combination of a driving and a driven shaft, a plurality of variable speed friction gear elements operatively connected to one of said shafts, a coöperating friction gear element mounted for rotation with the other shaft, means for shifting the last said element longitudinally of the first said gear elements to position the same with respect to a predetermined one of said elements, means coöperating with a portion of the said shifting means for preventing the engagement of the gear elements while the shiftable one of the friction elements is being adjusted, elastic means for causing the friction elements to be brought into engagement when the last said element is properly positioned, and means for varying the tension of said elastic means.

6. The combination of a driving and a driven shaft, a plurality of variable speed friction gear elements operatively connected to one of said shafts, a coöperating gear element mounted upon the other shaft for rotation therewith, means tending normally to hold the last said gear element into engagement with one of the first said elements, means for causing the coöperating gear elements to be disengaged against the tension of the first said means and for holding the gears out of engagement and means for shifting one of the gear elements longitudinally with respect to the coöperating elements to a predetermined position.

7. The combination of a driving and a driven shaft, a plurality of variable speed friction gear elements operatively connected to one of said shafts, a coöperating gear element mounted upon the other shaft for rotation therewith, means tending normally to hold the last said gear element into engagement with one of the first said elements, means including an operating handle for disengaging the coöperating gear elements against the tension of the first said means, said means being adapted to hold the gears out of engagement and to shift one of the gear elements longitudinally with respect to the remaining gear elements to a predetermined position, means coöperating with the first said means for locking the handle in its adjusted position, and additional means for automatically causing a further adjustment of the handle.

8. The combination of a driving and a driven shaft, a plurality of variable speed friction gear elements operatively connected to one of said shafts, a coöperating gear element mounted upon the other shaft for rotation therewith, means tending normally to hold the last said gear element into engagement with one of the first said elements, means including an operating handle for disengaging the coöperating gear elements against the tension of the first said means, said means being adapted to hold the gears out of engagement and to shift one of the gear elements longitudinally with respect to the remaining gear elements to a predetermined position, means coöperating with the first said means for locking the handle in its adjusted position, and means for automatically releasing the handle to permit a further movement thereof under the influence of gravity.

9. The combination of a driving and a driven shaft, a plurality of variable speed friction gear elements operatively connected to one of said shafts, a coöperating gear element mounted upon the other shaft for rotation therewith, means tending normally to hold the last said gear element into engagement with one of the first said elements, means for disengaging the coöperating gear elements against the tension of the first said means, said means being adapted to hold the gears out of engagement, a handle operatively related to said means and adapted to shift one of the gear elements longitudinally with respect to the remaining gear elements to a predetermined position, means for locking the handle in its adjusted position, and means for releasing the handle to permit the latter to automatically move to a position to prevent the gear elements from engaging.

10. The combination of a driving and a driven shaft, a plurality of variable speed friction gear elements operatively connected to one of said shafts, a coöperating gear element mounted upon the other shaft for rotation therewith, means tending normally to hold the last said gear element into engagement with one of the first said elements, means for disengaging the coöperating gear elements against the tension of the first said means, said means being adapted to hold the gears out of engagement, a handle operatively related to said means and adapted to shift one of the gear elements longitudinally with respect to the remaining gear elements to a predetermined position, means for locking the handle in its adjusted position, means for releasing the handle to permit the latter to automatically move to a position to prevent the gear elements from engaging, and means for limiting the last said movement of the handle.

11. The combination of a driving and a driven shaft, a plurality of variable speed friction gear elements operatively connected to one of said shafts, a coöperating gear element mounted upon the other shaft for rotation therewith, means tending normally to hold the last said gear element into engagement with one of the first said elements, means for disengaging the coöperating gear elements against the tension of the first said means and adapted to hold the gears out of engagement, a handle coöperating with said means adapted to shift one of the gear elements longitudinally with respect to the remaining gear elements to a predetermined position, means coöperating with the first said means for locking the handle in its adjusted position, means for releasing the handle to permit the latter to automatically move to a position to prevent the gear elements from engaging, a yielding member supported by the handle, and means coöperating with said yielding member for limiting the last said movement of the handle.

12. The combination of a driving and a driven shaft, a plurality of variable speed friction gear elements operatively connected to one of said shafts, a coöperating gear element mounted upon the other shaft for rotation therewith, means tending to normally hold the last said gear element in engagement with a predetermined one of the first said elements, means for disengaging the gear elements against the tension of the first said means, said means being adapted to hold the gears out of engagement, a lever coöperating with said means adapted to shift one of the gear elements longitudinally with respect to the remaining gear elements to a predetermined position, means coöperating with the first said means for locking the lever in its adjusted position, separate means for releasing the lever to permit an automatic movement thereof to a position to prevent the gears from being brought into engagement, and an operating lever for controlling the last said releasing means.

13. The combination of a driving and a driven shaft, a plurality of variable speed friction gear elements operatively connected to one of said shafts, a coöperating gear element mounted upon the other shaft for rotation therewith, means tending to normally hold the last said gear element in engagement with a predetermined one of the first said elements, means for disengaging the coöperating gear elements against the tension of the first said means, said means being adapted to hold the gears out of engagement, a lever adapted to shift one of the gear elements longitudinally with respect to the remaining gear elements to a predetermined position, means coöperating with the first said means for locking the lever in its adjusted position, separate means for releasing the lever to permit an automatic movement thereof to prevent the gears from being brought into engagement, an operating lever for controlling the said releasing means, and means for arresting the automatic movement of the first said lever.

14. The combination of a driving and a driven shaft, a plurality of independent variable speed friction gear elements operatively connected to one of the shafts, a coöperating gear element mounted upon and for rotation with the other shaft, adjustable bearings for one of the shafts, means tending normally to move said shaft toward the other shaft to cause the coöperating friction gear elements to engage, means for moving the adjustable shaft away from the other shaft to disengage the friction gear elements, and means operatively related to the last said means for shifting one of the elements longitudinally with respect to the coöperating elements.

15. The combination of a driving and a driven shaft, a plurality of independent variable speed friction gear elements operatively connected to one of the shafts, a coöperating gear element mounted upon and for rotation with the other shaft, adjustable bearings for one of the shafts, means tending normally to move said shaft toward the other shaft to cause the coöperating friction gear elements to engage, means for moving the adjustable shaft away from the other shaft to disengage the friction gear elements, means operatively related to the last said means for shifting one of the elements longitudinally with respect to the coöperating elements, and means for preventing the friction gears from engaging with each other until the entire bearing surface of the shiftable gear stands within planes which include the edges of the bearing surface of the coöperating friction gear element.

16. The combination of a driving and a driven shaft, a plurality of independent variable speed friction gear elements operatively connected to one of the shafts, a coöperating friction gear element mounted upon and for rotation with the other shaft, a pivotal support for one of the shafts, yielding means normally tending to hold the said coöperating gear element in engagement with one of the first said gear elements, an operating lever for shifting one of the gear elements longitudinally with respect to the first said elements to a position adjacent a predetermined one of said elements, and means operatively related to the lever for moving the support about its pivot against the tension of the said yielding means to disengage the gear elements and for holding the elements disengaged while the shiftable element is being adjusted.

17. The combination of a driving and a driven shaft, a plurality of independent variable speed friction gear elements operatively connected to one of the shafts, a coöperating friction gear element mounted upon and for rotation with the other shaft, a pivotal support for one of the shafts, yielding means normally tending to hold the said coöperating gear element in engagement with one of the first said gear elements, an operating lever for shifting one of the gear elements longitudinally with respect to the first said elements to a position adjacent a predetermined one of said elements, means operatively related to the lever for moving the support about its pivot against the tension of the said yielding means to disengage the gear elements and for holding the elements disengaged while the shiftable element is being adjusted, means for locking the said element and lever in their adjusted position and for permitting the gear elements to engage, and releasing the lever to permit the same to automatically assume a position to prevent the gears from engaging.

18. The combination of a driving and a driven shaft, a plurality of independent variable speed friction gear elements operatively connected to one of the shafts, a coöperating friction gear element mounted upon and for rotation with the other shaft, a pivotal support for one of the shafts, yielding means normally tending to hold the said coöperating gear element in engagement with one of the first said gear elements, an operating lever for shifting one of the gear elements longitudinally with respect to the first said elements to a position adjacent a predetermined one of said elements, means operatively related to the lever for moving the support about its pivot against the tension of the said yielding means to disengage the gear elements and for holding the elements disengaged while the shiftable element is being adjusted, means for locking the said element and lever in their adjusted position and for permitting the gear elements to engage, means for releasing the lever to permit the same to automatically assume a position to prevent the gears from engaging, and means for limiting such movement of the lever.

19. The combination of a driving and a driven shaft, friction gear elements operatively related to said shafts, means for causing the gear elements to be brought into engagement, an operating lever, means operatively related to the lever for disengaging the gear elements, means also operatively related to the lever for shifting one of the elements with relation to the coöperating gear element when said elements are out of engagement, means for locking the lever in its adjusted position, and means for unlocking the lever to permit a further movement thereof to a position to lock the gear elements out of engagement.

20. The combination of a driving and a driven shaft, friction gear elements operatively related to said shafts, means for causing the gear elements to be brought into engagement, an operating lever, means operatively related to the lever for disengaging the gear elements, means also operatively related to the lever for shifting one of the elements with relation to the coöperating gear element when said elements are out of engagement, means for locking the lever in its adjusted position, means for unlocking the lever to permit a further movement thereof to a position to lock the gear elements out of engagement, and means for limiting such movement of the lever.

21. The combination of a driving and a driven shaft, friction gear elements operatively related to said shafts, means tending normally to cause the gear elements to engage, an operating lever, means operatively related to the lever for disengaging the gear elements, means also operatively related to the lever for shifting one of the gear elements with respect to the coöperating element when the gears are out of engagement, means for locking the lever in its adjusted position and for permitting the gear elements to engage, means for releasing the lever to permit the latter to automatically move the gear element into an inoperative position, and separate means for limiting such movement and for locking the lever in the last said adjusted position.

22. The combination of a driving and a driven shaft, friction gear elements operatively related to said shafts, means tending normally to hold the gear elements in engagement, an operating lever, means operatively related to the lever for disengaging the gears, means also operatively related to the lever for shifting one of the elements longitudinally with respect to the other elements when the gear elements are out of engagement, means for unlocking the lever to disengage the gear elements and to permit the latter to automatically move the gears into an inoperative position, said means including an operating lever and means for compelling the adjustment of the last said lever before the operation of the first said lever.

23. The combination of a driving and a driven shaft, friction gear elements operatively related to said shafts, means tending normally to hold the gear elements in engagement, an operating lever, means operatively related to the lever for disengaging the gears, means also operatively related to the lever for shifting one of the elements longitudinally with respect to the other elements, when the gear elements are out of engagement, means for unlocking the lever to disengage the gear elements and to permit the latter to automatically move the gears into an inoperative position, said means including a foot lever, and means tending to hold the foot lever normally in the way of the operator to compel the adjustment of said lever.

24. The combination of a driving and a driven shaft, a plurality of independent variable speed friction gear elements operatively related to one of said shafts, a coöperating friction gear element on the other shaft, a pivoted support for one of the shafts, yielding means engaging the support for normally holding the last said gear element in operative engagement with a predetermined one of the first said elements, a rock shaft, an operative connection between the shaft and the pivoted support, means for longitudinally moving the shaft to rock the support to disengage the friction gears, means operatively related to the shaft and adapted to shift one of the gears longitudinally with respect to the coöperating gears while the gears are out of engagement and a lever for rocking the shaft.

25. The combination of a driving and a driven shaft, a plurality of independent variable speed friction gear elements operatively related to one of said shafts, a coöperating friction gear element on the other shaft, a pivoted support for one of the shafts, yielding means engaging the support for normally holding the last said gear element in operative engagement with a predetermined one of the first said elements, means for varying the tension of the said yielding means, a rock shaft, an operative connection between the shaft and the pivoted support, means for longitudinally moving the shaft to rock the support to disengage the friction gears, means operatively related to the shaft and adapted to shift one of the gears longitudinally with respect to the coöperating gears while the gears are out of engagement and a lever for rocking the shaft.

26. The combination of a driving and a driven shaft, a plurality of independent variable speed friction gear elements operatively related to one of said shafts, a coöperating friction gear element on the other shaft, a pivoted support for one of the shafts, yielding means engaging the support for normally holding the last said gear element in operative engagement with a predetermined one of the first said elements, a rock shaft, an operative connection between the shaft and the pivoted support, means for longitudinally moving the shaft to rock the support to disengage the friction gears, means operatively related to the shaft and adapted to shift one of the gears longitudinally with respect to the coöperating gears while the gears are out of engagement, a lever for rocking the shaft and means for varying the length of said shaft.

27. The combination of a driving and a driven shaft, a plurality of independent variable speed friction gear elements operatively related to one of the shafts, a coöperating friction gear element on the other shaft, a pivoted support for one of the shafts, yielding means engaging the support for normally holding the said gear element in operative engagement with a predetermined one of the first said elements, a rock shaft, means for longitudinally shifting the shaft, means connected to the shaft and to the support for moving the gear elements out of engagement when the shaft is shifted, means operatively related to the shaft and adapted to shift the gear element when said elements are out of engagement, a lever for rocking the shaft, and additional means for longitudinally moving the shaft to permit the gear element to be shifted automatically under the influence of the gravity of said lever.

28. The combination of a driving and a driven shaft, a plurality of independent variable speed friction gear elements operatively related to one of the shafts, a coöperating friction gear element on the other shaft, means tending to normally hold the gear elements in engagement, a longitudinally movable rock shaft, means controlled by the longitudinal movement of the shaft for disengaging the gear elements, a lever for rocking the shaft when the gear elements are disengaged, means operatively related to the shaft for shifting one of the gears longitudinally with respect to its coöperating gear when the shaft is rocked, an adjustable member, means operatively related to the shaft and coöperating with the member to longitudinally shift the shaft when the said member is adjusted, and means for adjusting said member.

29. The combination of a driving and a driven shaft, a plurality of independent variable speed friction gear elements operatively related to one of the shafts, a coöperating friction gear element on the other shaft, means tending to normally hold the gear elements in engagement, a longitudinally movable rock shaft, means controlled by the longitudinal movement of the shaft for disengaging the gear elements, a lever for rocking the shaft when the gear elements are disengaged, means operatively related to the shaft for shifting one of the gears longitudinally with respect to its coöperating gear when the shaft is rocked, an adjustable member, means operatively related to the shaft and coöperating with the member to longitudinally shift the shaft against the tension of the first said means when the said member is adjusted, means for adjusting said member, and means for returning the member to its normal position.

30. The combination of a driving and a driven shaft, a plurality of independent variable speed friction gear elements operatively related to one of the shafts, a coöperating friction gear element on the other shaft, means tending to normally hold the gear elements in engagement, a longitudinally movable rock shaft, means controlled by the longitudinal movement of the shaft for disengaging the gear elements, a lever for rocking the shaft when the gear elements are disengaged, means operatively related to the shaft for shifting one of the gear elements longitudinally with respect to its coöperating gear element when the shaft is rocked, an adjustable member, means operatively related to the shaft and coöperating with the member to longitudinally shift the shaft against the tension of the first said means when the said member is adjusted, means for adjusting the member and means for locking the lever in its adjusted position, the last said means serving also to permit the gear elements to be brought into engagement under the influence of the first said means.

31. The combination of a driving and a driven shaft, a plurality of independent variable speed friction gear elements operatively related to one of the shafts, a coöperating friction gear element on the other shaft, means tending normally to hold the gear elements in engagement, a longitudinally movable rock shaft, means controlled by the longitudinal movement of the shaft for disengaging the gear elements, a lever operatively related to the shaft, an adjustable member, means operatively related to the shaft and coöperating with the member to longitudinally shift the shaft when the member is adjusted, means for adjusting said member, said lever being adapted to be adjusted to rock the shaft when the gear elements are out of engagement, means for locking the lever in its adjusted position, and means for releasing the lever to permit an automatic movement to a position to lock the gears out of engagement.

32. The combination of a driving and a driven shaft, a plurality of independent variable speed friction gear elements operatively related to one of the shafts, a coöperating friction gear element on the other shaft, means tending normally to hold the elements in engagement, a longitudinally movable rock shaft, means controlled by the longitudinal movement of the shaft for disengaging the gears, means operatively related to the shaft and adapted to shift one of the gears longitudinally with respect to the coöperating gear to a predetermined position when the shaft is rocked, a lever for rocking the shaft, means for locking the lever and gear in their adjusted position and for permitting the gears to engage, a rotatable member supported by the shaft, means operatively related to the shaft and to the member to longitudinally shift the shaft, and means operatively related to the lever for rotating the said member.

33. The combination of a driving and a driven shaft, a plurality of independent variable speed friction gear elements operatively related to one of the shafts, a coöperating friction gear element on the other shaft, means tending normally to hold the elements in engagement, a longitudinally movable rock shaft, means controlled by the longitudinal movement of the shaft for disengaging the gears, means operatively related to the shaft and adapted to shift one of the gears longitudinally with respect to the coöperating gear to a predetermined position when the shaft is rocked, a lever for rocking the shaft, means for locking the lever and gear in their adjusted position and for permitting the gears to engage, a member supported by and movable independently of the shaft with one face adjacent one face of the lever, one of said faces being provided with a recess, a roller supported by the adjacent face of the other element and adapted to enter the recess, and means for displacing the roller or the recess with respect to one another to longitudinally shift the shaft.

34. The combination of a driving and a driven shaft, friction gear elements operatively related to the shafts, means for causing the gear elements to be brought into engagement, a longitudinally adjustable rock shaft arranged transversely of the first said shaft, means controlled by the longitudinal movement of the shafts for disengaging the gears, a lever for rocking the shaft, means operatively related to the shaft and adapted to shift one of the gears with respect to the coöperating gears when the shaft is rocked, a lever for rocking the shaft when the latter is longitudinally adjusted, means coöperating with the first said means to lock the lever against adjustment, an axially rotatable member supported by the shaft with one face adjacent one face of the lever, a roller supported by one of the said faces, the other face being provided with a recess adapted to receive the roller, and means for moving the member to cause the roller or recess to be displaced with respect to one another to longitudinally adjust the rock shaft to unlock the lever.

35. The combination of a driving and a driven shaft, friction gear elements operatively related to the shafts, means for causing the gear elements to be brought into engagement, a longitudinally adjustable rock shaft arranged transversely of the first said shaft, means controlled by the longitudinal movement of the shafts for disengaging the gears, a lever for rocking the shaft to shift one of the gears with respect to the coöperating gears when the shaft is adjusted, means coöperating with the first said means to lock the lever against adjustment, an axially rotatable member supported by the shaft with one face adjacent one face of the lever, a roller supported by one of the said faces, the other face being provided with a recess adapted to receive the roller, means for moving the member to cause the roller or recess to be displaced with respect to one another to longitudinally adjust the rock shaft to unlock the lever, and additional means for longitudinally shifting the rock shaft to unlock the lever and separate the gear elements.

36. The combination of a driving and a driven shaft, friction gear elements operatively related to the shafts, means for causing the gear elements to be brought into engagement, a longitudinally adjustable rock shaft arranged transversely of the first said shaft, means controlled by the longitudinal movement of the shafts for disengaging the gears, a lever for rocking the shaft to shift one of the gears with respect to the coöperating gears when the shaft is adjusted, means coöperating with the first said means to lock the lever against adjustment, an axially rotatable member supported by the shaft with one face adjacent one face of the lever, a roller supported by one of the said faces, the other face being provided with a recess adapted to receive the roller, means for moving the member to cause the roller or recess to be displaced with respect to one another to longitudinally adjust the rock shaft to unlock the lever, and additional means for longitudinally shifting the rock shaft to unlock the lever and separate the gear elements, to permit the said lever to automatically assume a position to prevent the engagement of the gear elements.

37. The combination of a driving and a driven shaft, a plurality of independent variable speed friction gear elements operatively connected to one of the shafts, a coöperating friction gear element mounted on the other shaft for rotation therewith, means for shifting the last said gear longitudinally on the shaft and with respect to the first said elements including a pivoted yoke for the gear element, a rack supported by the yoke, means detachably engaging the rack for holding the yoke against pivotal movement, means for bodily adjusting the gear element out of engagement with the first said elements, a lever operatively connected to the last said means, and a gear controlled by the lever and detachably engaged by the rack for shifting the friction gear element when the latter is out of engagement with the coöperating gear element.

38. The combination of a driving and a driven shaft, a plurality of friction gear elements operatively related to one of the shafts, a coöperating gear element supported by and adjustable on the other shaft, a pivoted support for one of the shafts, means for engaging the support for holding the gear elements in engagement, a longitudinally adjustable rock shaft, means whereby the longitudinal adjustment of said shaft will rock the support to disengage the gear, a lever for rocking the shaft to shift the gear element longitudinally on its supporting shaft when out of engagement with the coöperating gear, a yoke for shifting said gear element, a rack supported by the yoke, a pinion engaging the rack, a segment operatively related to the rock shaft and the pinion for shifting the yoke when the shaft is rocked, and means coöperating with said lever for preventing the adjustable friction gear element from being shifted from one of its coöperating elements to another when said gear elements are in engagement.

39. The combination of a driving and a driven shaft, a plurality of friction gear elements operatively related to one of the shafts, a coöperating gear element supported by and adjustable on the other shaft, a pivoted support for one of the shafts, means for engaging the support for holding the gear elements in engagement, a longitudinally adjustable rock shaft, means whereby the longitudinal adjustment of said shaft will rock the support to disengage the gear, a lever for rocking the shaft to shift the gear element longitudinally on its supporting shaft when out of engagement with the coöperating gear, a pivoted yoke for shifting said gear element, a rack supported by the yoke, a pinion engaging the rack, removable means engaging the rack to hold the yoke in operative position with relation to the friction gear element and to permit the yoke to be swung out of operative position, a segment operatively related to the rock shaft and the pinion for shifting the yoke when the shaft is rocked, and means coöperating with said lever for preventing the adjustable friction gear element from being shifted from one of its coöperating elements to another when said gear elements are in engagement.

In testimony whereof I have signed my name to this specification, in the presence of two subscribing witnesses, on this 24 day of March A. D. 1908.

D. E. WASHINGTON.

Witnesses:
    J. H. JOCHUM, Jr.,
    M. W. CANTWELL.